(12) United States Patent
Dornseiffer et al.

(10) Patent No.: US 10,403,881 B2
(45) Date of Patent: Sep. 3, 2019

(54) METHOD FOR PRODUCING CERAMIC CATHODE LAYERS ON CURRENT COLLECTORS

(71) Applicant: Forschungszentrum Juelich GmbH, Juelich (DE)

(72) Inventors: Juergen Dornseiffer, Aachen (DE); Hans-Gregor Gehrke, March (DE); Manuel Krott, Stolberg (DE); Olivier Guillon, Juelich (DE); Sven Uhlenbruck, Juelich (DE)

(73) Assignee: FORSCHUNGSZENTRUM JUELICH GMBH, Juelich (DE)

( * ) Notice: Subject to any disclaimer, the term of this patent is extended or adjusted under 35 U.S.C. 154(b) by 0 days.

(21) Appl. No.: 16/066,321

(22) PCT Filed: Dec. 9, 2016

(86) PCT No.: PCT/EP2016/002084
§ 371 (c)(1),
(2) Date: Jun. 27, 2018

(87) PCT Pub. No.: WO2017/129209
PCT Pub. Date: Aug. 3, 2017

(65) Prior Publication Data
US 2019/0013512 A1    Jan. 10, 2019

(30) Foreign Application Priority Data

Jan. 27, 2016 (DE) .................. 10 2016 000 799

(51) Int. Cl.
*H01M 4/00* (2006.01)
*H01M 4/04* (2006.01)
(Continued)

(52) U.S. Cl.
CPC ....... *H01M 4/0471* (2013.01); *H01M 4/1391* (2013.01); *H01M 4/664* (2013.01); *H01M 10/0525* (2013.01)

(58) Field of Classification Search
CPC ... H01M 4/0471; H01M 4/664; H01M 4/1391
See application file for complete search history.

(56) References Cited

U.S. PATENT DOCUMENTS

2006/0275664 A1* 12/2006 Ohzuku ............... C01G 23/005
429/220
2008/0318129 A1   12/2008 Lewis et al.
(Continued)

FOREIGN PATENT DOCUMENTS

DE    102011050461 A1    11/2012
EP       1851815 B1     12/2011
(Continued)

OTHER PUBLICATIONS

Shingo Ohta, et al., "All-solid-state lithium ion battery using garnet-type oxide and $Li_3BO_3$ solid electrolytes fabricated by screen-printing", Journal of Power Sources 238, Dec. 2013, pp. 53-56.
(Continued)

*Primary Examiner* — Nicholas P D'Aniello
(74) *Attorney, Agent, or Firm* — Leydig, Voit & Mayer, Ltd.

(57) ABSTRACT

A method for producing a ceramic cathode layer on an electrically conductive substrate includes applying a coating to the electrically conductive substrate, the coating being in a form of a suspension including at least one suspending agent and at least one ceramic material. The method further includes heating the coating in a reducing atmosphere such that the ceramic material is completely or in part reduced to a fusible reaction product, heating the coating in a reducing atmosphere to temperatures above the melting point of the reaction product so as to form a melt, densifying or sintering the coating in a reducing atmosphere at temperatures that are 100° C. greater than a melting temperature of the reaction product, and reoxidizing the densified or sintered coating in an oxidizing atmosphere in a temperature range of between 400° C. and 1,200° C.

19 Claims, 1 Drawing Sheet

(51) Int. Cl.
*H01M 4/1391* (2010.01)
*H01M 10/0525* (2010.01)
*H01M 4/66* (2006.01)

(56) References Cited

U.S. PATENT DOCUMENTS

| | | | | |
|---|---|---|---|---|
| 2009/0098281 | A1* | 4/2009 | Zhang | H01M 4/0404 427/77 |
| 2009/0166187 | A1* | 7/2009 | Nagase | C23C 14/3414 204/192.17 |
| 2015/0104713 | A1 | 4/2015 | Gaben et al. | |
| 2015/0311507 | A1* | 10/2015 | Miki | H01M 4/366 429/231.8 |

FOREIGN PATENT DOCUMENTS

| | | |
|---|---|---|
| JP | 5646088 B1 | 12/2014 |
| WO | WO 2007044904 A2 | 4/2007 |

OTHER PUBLICATIONS

Tobias Stockhoff, et al., "Ion beam sputter-deposition of $LiCoO_2$ films", Thin Solid Films 520, Dec. 2012, pp. 3668-3674.

P. Jeevan Kumar, et al., „Enhanced electrochemical properties of as grown $LiCoO_2$ film cathodes: Influence of silicon substrate surface texturing, Materials Chemistry and Physics 143, Dec. 2014, pp. 536-544.

Guangfen Li, et al., "Synthesis of nano-sized lithium cobalt oxide via a sol-gel method", Applied Surface Science 258, Dec. 2012, pp. 7612-7616.

* cited by examiner

METHOD FOR PRODUCING CERAMIC CATHODE LAYERS ON CURRENT COLLECTORS

CROSS REFERENCE TO RELATED APPLICATIONS

This application is a U.S. National Stage Application under 35 U.S.C. § 371 of International Application No. PCT/EP2016/002084 filed on Dec. 9, 2016, and claims benefit to German Patent Application No. DE 10 2016 000 799.0 filed on Jan. 27, 2016. The International Application was published in German on Aug. 3, 2017 as WO 2017/129209 A1 under PCT Article 21(2).

FIELD

The invention relates to a novel method for producing ceramic cathode layers on current collectors, in particular for lithium-ion batteries.

BACKGROUND

The ongoing development and spread of mobile communication and computer technology requires inherently reliable, high-performance and inexpensive batteries having a high specific storage capacity. Great efforts are therefore being made worldwide to develop power storage mediums that meet these requirements. The battery system based on lithium-ion technology is believed to have the best chances of success in this respect.

One of the most frequently used cathode materials in commercial lithium-ion batteries is currently lithium cobalt dioxide, hereinafter "lithium cobalt oxide" (LCO) for short, on account of its high storage capacity and its favorable electrochemical behavior. When Li-ion batteries are produced, said material is first mixed, in powdered form, with conductive carbon, such as graphite or soot, and a polymer binder, such as polyvinylidene fluoride, which contribute, inter alia, to the compensation of the change in volume when the active material is charged and discharged, and is rolled, in the form of a paste, onto a metal film that is used as a current collector. In a subsequent step, an organic, liquid (e.g. lithium hexafluorophosphate in ethylene and dimethyl carbonate) or polymer-based (e.g. lithium salts in polyethylene oxide) electrolyte, followed by an anode layer, is applied in a cathode-supported cell structure.

The drawbacks to a structure of this kind are both the lack of cycle stability, i.e. the slow loss in capacity (degradation) upon each charge and discharge process, and the unsatisfactory temperature stability, which may lead to the battery catching fire in the event of a technical defect or improper use, on account of the high proportion of organic materials.

One approach for overcoming these drawbacks would be to dispense entirely with carbon-based functional materials when these batteries are produced, as is envisaged by the concept of the solid-state lithium-ion battery, for example. In a much-promising variant of this type of battery, the cathode and the electrolyte consist of a ceramic solid which, combined with an anode made of lithium or a solid that holds lithium, for example elementary silicon, guarantees a high degree of operational safety and considerably improved cycle stability. One condition for the production of this kind of battery consists in process steps that allow both sufficient densification of the functional layers and an effective ion-conducting and possibly electron-conducting connection within the layers and beyond the layer boundaries.

The literature currently discloses very few methods that describe the production of carbon-free lithium cobalt oxide cathode layers for constructing lithium-ion batteries. For example, Ohta et al. (Journal of Power Sources, 238 (2013) 53-56) describe a method for depositing LCO/lithium borate cathode layers on a niobium-doped lithium lanthanum zirconate electrolyte.

However, for the basic research, evaporation and sputter methods, such as atomic layer deposition (ALD), ion beam layer deposition and physical or chemical vapor deposition (PVD, CVD), were described for applying pure LCO to various substrates. For example, Kumar et al. (Materials Chemistry and Physics 143 (2014) 536-544) used a radio frequency magnetron sputter process to grow submicron ($d<1$ μm) epitactic LCO films on textured Au/Ti/SiO$_2$ substrates. Stockhoff et al. (Thin Solid Films 520 (2012) 3668-3674) describe, for example, a method in which 200 nm thick LCO films can be applied to silicon wafers by means of ion beam sputter deposition.

Spin-on methods for depositing LCO layers using coating solutions that were produced by means of a sol-gel process are also known in the literature. For example, Gunagfen et al. (Applied Surface Science 258 (2012) 7612-7616) describe a sol-gel method using a polyvinyl pyrrolidone chelating agent to thus deposit submicron ($d<1$ μm) LCO films on silicon wafers by means of a spin-on process.

According to the prior art, all-ceramic lithium cobalt oxide cathode layers without carbon-based additives for improving the electron and ion conductivity can thus currently only be deposited on current collectors having layer thicknesses in the submicron ($d<1$ μm) range by means of technically complex evaporation or sputter methods or by means of spin-on methods using sol-gel based coating solutions. However, the deposition of pure LCO layers is in principle limited to a few micrometers on account of the anisotropic ion conductivity of the lithium cobalt oxide as a result of its layer structure and the resultant decrease in the current density as the layer thickness increases, the LCO crystallites being randomly oriented in the cathode. In principle, epitactically grown, pure LCO layers having preferred orientation can be produced on current collectors by means of evaporation or sputter methods; however, on account of the low rates of deposition, the thus produced layer thicknesses are generally limited to the micrometer range.

However, considerably thicker cathode layers, which can only be achieved by simultaneously increasing the achievable current density by mixing in a solid electrolyte, are needed to achieve the required high storage capacities in lithium-ion batteries. It is not in principle possible to produce composite electrodes of this kind by means of evaporation and sputter methods.

SUMMARY

In an embodiment, the present invention provides a method for producing a ceramic cathode layer on an electrically conductive substrate. The method includes applying a coating to the electrically conductive substrate, the coating being in a form of a suspension including at least one suspending agent and at least one ceramic material. The method further includes heating the coating in a reducing atmosphere such that the ceramic material is completely or in part reduced to a fusible reaction product, heating the coating in a reducing atmosphere to temperatures above the melting point of the reaction product so as to form a melt, densifying or sintering the coating in a reducing atmosphere at temperatures that are 100° C. greater than a melting temperature of the reaction product, and reoxidizing the densified or sintered coating in an oxidizing atmosphere in a temperature range of between 400° C. and 1,200° C. The reaction product is oxidized again and reacts so as to arrive back at the original composition of the ceramic material used.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
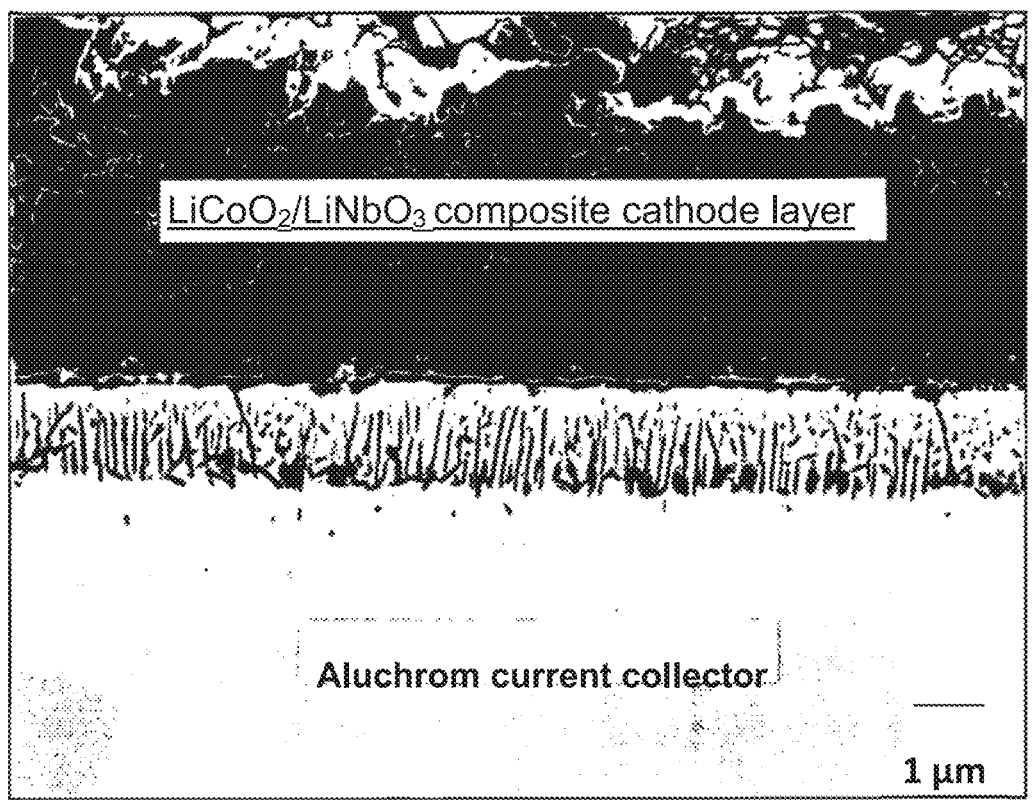
FIG. 1 is a scanning electron microscope image of a cross section polish of the porous morphology of the sintered LCO/LNO composite cathode layer on the Aluchrom current collector.

Embodiments of the invention provide simple methods for producing an all-ceramic cathode layer, without carbon-based additives for improving the electron and ion conductivity, for constructing lithium-ion batteries. Methods according to embodiments of the invention also advantageously allow a variable layer thickness of the produced cathode layer that can be applied to an electrically conductive substrate. Methods according to embodiments of the invention also make it possible for the cathode layer to be advantageously produced without a functionally impairing change in the electrically conductive substrate. Furthermore, methods according to embodiments of the invention also make it possible for a solid electrolyte to be added to the cathode layer in order to improve the achievable current densities and for said cathode layer to be thus deposited as a composite electrode.

According to embodiments of the invention, reactive low-temperature sintering of a ceramic material is performed in a two-stage process in different reactor atmospheres. An electrically conductive carrier material is first coated with a coating suspension in the form of slips or pastes comprising the ceramic material. The coating can take place at room temperature. After the solvent has been removed by means of drying at less than 200° C., a non-sintered layer, or "green layer", optionally also containing organic binder components, is obtained.

In the first method step, said green layer is then heated in a reducing atmosphere. In this process, the ceramic material is completely or in part converted to at least one reaction product that can melt when the temperature is further increased to 1,200° C. and thus causes the coating layer to be densified.

In an advantageous embodiment, during this consolidation or densification step, the temperature is intended to be increased to more than 100° C. above the melting point of said reaction product in order to prevent other reaction products from thermally decomposing or the electrically conductive substrate from irreversibly changing.

In a second method step in an oxidizing atmosphere, for example by means of the addition of oxygen, the reaction product that was first melted and densified in the first method step is reconverted to the starting composition of the ceramic material. This reoxidation step may take place either directly by simply changing the reducing atmosphere to an oxidizing atmosphere at the same temperature as in the first method step or by means of a separate process step in the temperature range of between 400° C. and 1,200° C.

The two method steps may preferably be carried out in a reactor.

There are in principle no limits to the grain sizes of the ceramic powder used in the coating suspensions. However, powders having a narrow particle size distribution of which the $D_{50}$ values are less than 1 μm are preferably used in order to obtain a high degree of densification of the cathode layers.

In principle, all known methods, such as molding, drawing, spinning, immersing, inkjet-printing or offset-printing said coating suspensions on the metal current collectors may be used as coating methods for applying the ceramic layer to a uniform layer thickness on a metal carrier. In principle, there are no limits to the layer thicknesses that can be achieved in this process.

All conventional cathode materials, such as calcium-containing or alkali metal-containing iron-based, nickel-based and cobalt-based oxide ceramics, such as lithium cobalt oxide, may be used as ceramic materials for the cathode layer.

Methods according to embodiments of the invention are not in principle limited to the sintering of cathode layers on electrically conductive metal or ceramic substrates, but can also be used to densify ceramic molded bodies.

Furthermore, the sintered ceramic material may also comprise a heterogeneous composition in the form of a composite, provided that at least some of the ceramic material can be converted, in a first, reductive method step, to a fusible reaction product required for consolidation and sintering.

In one particular embodiment, a metal carrier material is coated with a coating suspension in the form of slips or pastes comprising mainly powdered, commercial lithium cobalt dioxide ($LiCoO_2$) as a ceramic material, hereinafter "lithium cobalt oxide" or "LCO" for short. The coating may take place at room temperature. After the solvent has been removed by means of drying at less than 200° C., a non-sintered layer, or "green layer", optionally also containing organic binder components, is obtained.

In the first method step, said green layer is then heated in a reducing atmosphere, optionally containing carbon dioxide, to temperatures of approximately 700° C. In these reducing atmospheric conditions in the reactor, the trivalent cobalt in the lithium cobalt oxide is reduced to metallic cobalt, either completely or only at the surface of the powder grains. Lithium oxide is formed as a biproduct, which is reacted with carbon dioxide, which is either mixed into the reactor atmosphere or originates in situ from the thermal decomposition of the binder components mixed into the coating suspension, so as to form lithium carbonate.

By further heating said reaction product in the same reducing atmosphere to temperatures above the melting point of the lithium carbonate, approximately 720° C., the layer is densified, it being possible for the melt to possibly also contain lithium oxide that is still solid, in addition to lithium carbonate and the metallic cobalt.

The subsequently established sintering temperature is intended to be consistently even higher, but lower than 1,000° C. in order to suppress excessive thermal decomposition of the lithium carbonate and evaporation of the lithium oxide formed in the process. This would otherwise lead to a depletion of lithium in the resultant layer to detrimental effect. Sintering temperatures of less than 850° C. and particularly preferably sintering temperatures of around 800° C. are therefore preferred.

In order to form a sintered LCO cathode layer, in a second step the metallic cobalt is oxidized again to form cobalt oxide by adding oxygen, preferably to the reactor atmosphere, which cobalt oxide reacts with the lithium carbonate in a solids reaction in which carbon dioxide is supplied, so as to form lithium cobalt oxide. This final reoxidation step may take place either directly by simply changing the reducing reactor atmosphere to an oxidizing reactor atmosphere at the same temperature as in the first method step or by means of a separate process step in the temperature range of between 400° C. and 1,000° C.

There are in principle no limits to the grain sizes of the lithium cobalt oxide powder used in the coating suspensions. However, within the scope of this invention, powders having a narrow particle size distribution of which the $D_{50}$ values are less than 1 μm are used in order to obtain the greatest possible degree of densification of the cathode layers.

In principle, all known methods, such as molding, drawing, spinning, immersing, inkjet-printing or offset-printing said coating suspensions on the metal current collectors may be used as coating methods for applying the lithium cobalt oxide-based layer to a uniform layer thickness on a metal carrier. In principle, there are no limits to the layer thicknesses that can be achieved in this process.

In another preferred embodiment of the invention, lithium and cobalt compounds, or salts thereof, that are soluble in the suspending agent used, are additionally mixed into the coating suspension. By means of this addition, the melt of lithium carbonate and metallic cobalt that is needed to consolidate the LCO layer in the first method step is formed mainly of these compounds, and it is not therefore necessary to excessively or completely dissolve the LCO powder grains in order to consolidate the layer.

In the coating suspensions, these metal compounds also frequently act as binders that ensure the necessary densification of the green layers and thus render the addition of organic binder systems superfluous.

In this regard, all soluble salts of these metals, such as nitrates, may in principle be used, but preferably carboxylates and particularly preferably propionates, which form carbon dioxide during pyrolysis in a reducing atmosphere and thus make it possible to form lithium carbonate. It is not necessary to add carbon dioxide to the reducing atmosphere in this case.

If compounds and salts that do not form carbon dioxide when they thermally decompose are used, carbon dioxide could preferably, as an alternative, be mixed into the reducing atmosphere, for example the reactor gas, in the first sub-process, i.e. that of reductive sintering, in order to ensure the formation of fusible lithium carbonate.

In this process, the proportions of the lithium and cobalt compounds mixed into the coating suspension are intended to correspond to the stoichiometric lithium-to-cobalt ratio of the LCO in order to obtain as phase-pure as possible a product following the reoxidation in the second process step. However, depending on the lithium absorption capacity of the metal current collector used, lithium in the form of the lithium compound used may also be hyperstoichiometrically added to the coating suspension in order to compensate for any loss of lithium. Different metals generally also have a different Li absorption capacity. This also applies to non-metal current collectors. Depending on the sintering conditions used, lithium oxide may also evaporate from the layer at high temperatures (of more than 800° C. and in the case of a longer sintering time), leading to loss of lithium.

There are in principle no limits to the percentages by mass of said soluble lithium and cobalt compounds, or salts thereof, in the coating suspension, but these percentages are typically between 5 and 30 wt. %. Approximately 20 wt. %, based on the total mass of LCO in the coating slip and in the form of the lithium and cobalt compounds, is preferably mixed in, this solid component being calculated as an LCO mass equivalent following the reductive decomposition of these precursors and subsequent reoxidation. However, a percentage by mass of approximately only 10 wt. % is particularly preferably used to prevent the excess formation of gas when the green layers are consolidated in the first method step, which may lead to the formation of cracks in the sintered layers.

In methods according to embodiments of the invention, lower alcohols, such as methanol or ethanol, which ensure effective cross-linkability of the coating suspensions on the metal current collector films can preferably be used as suspending agents. However, other solvents in which the selected lithium and cobalt compounds are sufficiently soluble may also be used.

In another embodiment of the invention, a solid electrolyte, such as lithium niobate or lithium lanthanum zirconate, is mixed into the coating suspension, either in addition to or as an alternative to the lithium and cobalt compounds, or the salts thereof, which electrolyte improves the lithium-ion conductivity within the sintered cathode layer and thus increases, to the same degree, the achievable current densities of a battery provided with said cathode. There are in principle no limits to the percentage by weight of the solid electrolyte based on the LCO mass. However, said percentage is intended to be less than 50 wt. % in order to ensure a sufficiently high capacity of the resultant cathode layer.

There are in principle no limits to the grain sizes of the solid electrolyte used; however, powders having a narrow particle size distribution of which the $D_{50}$ values are less than 1 μm are preferably used in order to obtain the greatest possible degree of distribution and thus effectiveness in the cathode layer. However, for this reason, nanoparticles of this compound are particularly preferably used, which nanoparticles can be mixed into the coating suspension in a particularly simple manner in the form of a dispersion.

In principle, it is possible to use, as a solid electrolyte, any compounds that are sufficiently stable at the selected sintering temperature or in the reductive atmosphere and do not form, together with the cathode material, any function-impairing reaction products.

The partial pressure of oxygen in the reactor atmosphere during the reductive sintering in the first process step is intended to be less than 1,000 ppm, but preferably less than 1 ppm, and particularly preferably less than 0.1 ppm. Inversely, the oxygen component in the furnace gas during the reoxidation of the consolidated layers in the second process step is intended to be more than 1,000 ppm, preferably more than 10,000 ppm, and particularly preferably more than 100,000 ppm.

In principle, it is possible to use, as a current collector substrate, any metals and alloys thereof that do not form any function-impairing reaction products during the sintering process and have only a low lithium absorption capacity or none at all. Temperature-resistant and oxidation-resistant stainless steels, such as Aluchrom HF, material number 1.4767, or metallic chromium, are therefore preferably used, particularly preferably thin films made of 1.4767 that have been covered with a submicron chromium layer.

Methods according to embodiments of the invention are not limited to the production of sintered LCO layers on metal carrier films, but can be used in any case in which the reductive conversion of a ceramic material forms a fusible reaction product that is used to densify the material and, in the subsequent reoxidation step, is reconverted back to the original composition. The sintered materials here are either ceramic molded bodies or layers on substrates that are of metal or ceramic origin. It is also possible to sinter composite materials having a heterogeneous composition, at least one component providing the fusible reaction product required for consolidation in the reductive process step. Said composite materials may of course also be produced by using, in the coating suspensions, soluble metal precursors which, following pyrolytic decomposition and subsequent oxidation in the second process step, have a different composition to that of the second originally powdered component.

According to embodiments of the invention, reactive consolidation of the deposited green layers in the first method step requires a reductive reactor atmosphere. For this reason, it is necessary to carefully establish and, where necessary, monitor the partial pressure of oxygen in the reactor gas in this process step. It should also be ensured that the sintered lithium cobalt oxide layers are hygroscopic such that they can be transported and/or stored in a protective gas atmosphere.

In a particularly advantageous embodiment, a solid electrolyte is also mixed into the LCO layer in the form of electrolyte nanoparticles in order to increase the achievable current densities in a thus produced lithium-ion battery. Said nanoparticles can be synthesized in a particularly simple manner by means of a sol-gel process in which humidity-sensitive precursors are used. The documents that allow a person skilled in the art to prepare said nanoparticles in a protective gas atmosphere should therefore be available to said person.

In methods according to embodiments of the invention, the sintered ceramic materials may be either ceramic molded bodies or layers of which the substrates are of metal or ceramic origin. Furthermore, in methods according to embodiments of the invention, the sintered ceramic materials may have a heterogeneous composition in the form of a composite, at least one component providing the fusible reaction product required for consolidation and sintering in the reductive first process step.

According to embodiments of the invention, it is possible to produce firmly adhering, sintered lithium cobalt oxide-based cathode layers on metal current collector films, which layers also contain a solid electrolyte in the form of lithium niobate in order to increase the achievable current densities, in a simple manner by spray-coating Aluchrom HF stainless steel films, material number 1.4767, having a thickness of 50 μm, with coating suspensions that contain mainly commercial LCO powder. Reactive consolidation then takes places at 800° C. in a reductive atmosphere, followed by reoxidation with oxygen at the same temperature. In order to improve the electrochemical properties of the resultant composite materials, the Aluchrom HF sheet had previously been sputtered by means of a radio frequency magnetron sputter process, firstly reactively with a 200 nm thick chromium nitride layer and then with an approximately 50 nm thick chromium layer.

In addition to ground commercial LCO powder having a $D_{50}$ value of approximately 1 μm and lithium niobate nanoparticles, a slip that is particularly suitable for the coating and has a solids content of 35 wt. % also contains a mixture of lithium propionates and cobalt propionates, which were used in a mass ratio of 80/10/10 wt. %, the solids component of the propionate precursors having been calculated on the basis of the LCO mass equivalent following reductive calcination and subsequent reoxidation of a stoichiometric mixture.

The preparation of the lithium niobate (LNO) nanoparticles required for this purpose, which were directly obtained as a stable dispersion by means of microemulsion-assisted synthesis, can be described as follows: in order to synthesize 100 g of a lithium niobate ($LiNbO_3$) dispersion having a typical solids content of 5 wt. %, 0.235 g of metallic lithium and 10.763 g of freshly distilled niobium pentaethoxide are dissolved in 70.83 g of methanol at room temperature in an argon atmosphere. The subsequent hydrolysis of this humidity-sensitive precursor solution by means of a stoichiometric amount of water takes place by slowly dripping in 18.173 g of a microemulsion consisting of 2.72 wt. % hexadecylamine, 3.57 wt. % methoxy acetic acid, 10.06 wt. % distilled water, 7.76 g 1-pentanol and 75.89 wt. % cyclohexane. Once all of the microemulsion has been added, an optically isotropic, practically water-white lithium niobate dispersion having a practically monodisperse particle size distribution and an average particle diameter of 3 nm is directly obtained.

In order to produce 100 g of a coating suspension according to the invention having a solids content of 35 wt. %, 28 g of commercial LCO powder that has been ground down to an average grain size of approximately 1 rpm ($D_{50}$ value) by means of a ball mill, 7.34 g of cobalt(II) propionate and 3.29 g of lithium propionate (15 wt. % excess to compensate for loss of lithium during the sintering process) are dissolved or suspended in approximately 50 g of methanol. 70 g of the lithium niobate dispersion having a solids content of 5 wt. % is added to this suspension drop by drop, and the mixture is stirred for approximately 24 hours.

Once homogenization is complete, some of the solvent is evaporated until the resultant thin slip has reached a mass of 90 g. 10 g of 1-butanol is then added to this mixture, which addition acts as a thickener for suppressing rapid sedimentation of the LCO powder in the suspension and is stirred again for two hours. The resultant slightly viscous slip can be used straightaway to spray-coat the metal current collector films by means of a spray gun driven by compressed air.

Following two hours of drying in a drying cabinet at 200° C. in order to completely remove the suspending agent, the LCO green layers are reactively consolidated in the first method step by rapidly heating the composite material to 800° C. in a gas-tight furnace which has a heating rate of approximately 20 K/s in an argon atmosphere flowing at a speed of approximately 10 cm/min and which has a partial pressure of oxygen of 0.1 ppm.

Following ten minutes of age-hardening at 800° C., in the second method step oxygen is added to the argon at the same temperature until the reactor gas has an $O_2$ concentration of 100,000 ppm, in order to reoxidize the now densified cathode layer. In order to complete the LCO phase formation, the composite sheet is age-hardened in these conditions for another 10 minutes.

Following cooling at a cooling rate of 20 K/s, as before, the thus obtained blue/green, crack-free LCO/LNO cathode layers are stored in an argon atmosphere until they are further processed. FIG. 1 is a scanning electron microscope image of a cross section polish of the porous morphology of the sintered LCO/LNO composite cathode layer on the Aluchrom current collector.

Figure 2:
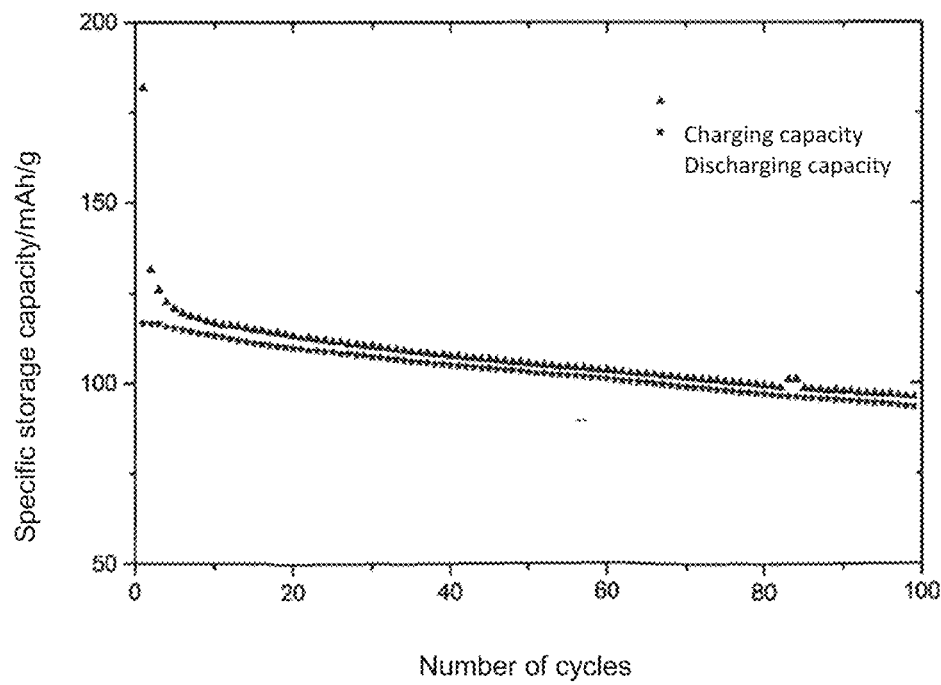
FIG. 2 shows a progression of the specific storage capacity with respect to the number of cycles, a loss of capacity of 16% having been observed after 100 cycles.

In order to test the electrochemical activity, a half-cell was constructed by means of the composite cathode layers according to the invention in an argon atmosphere, with a liquid lithium hexafluorophosphate electrolyte, dissolved in a mixture of ethylene carbonate and dimethyl carbonate, and a metal lithium film being used as an anode. The cell was then galvanostatically charged and discharged 100 times at room temperature in a voltage range of from 3.0 to 4.2 V at a current density of 0.5 C. FIG. 2 shows the thus obtained progression of the specific storage capacity with respect to the number of cycles, a loss of capacity of 16% having been observed after 100 cycles.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for producing a ceramic cathode layer on an electrically conductive substrate, the method comprising:
   a) applying a coating to the electrically conductive substrate, the coating being in a form of a suspension including at least one suspending agent and at least one ceramic material,
   b) heating the coating in a reducing atmosphere such that the ceramic material is completely or in part reduced to a fusible reaction product,
   c) heating the coating in a reducing atmosphere to temperatures above the melting point of the reaction product so as to form a melt,
   d) densifying or sintering the coating in a reducing atmosphere at temperatures that are 100° C. greater than a melting temperature of the reaction product, and
   e) reoxidizing the densified or sintered coating in an oxidizing atmosphere in a temperature range of between 400° C. and 1,200° C., wherein the reaction product is oxidized again and reacts so as to arrive back at the original composition of the ceramic material used.

2. The method according to claim 1, wherein calcium-containing or alkali metal-containing iron-based, nickel-based and cobalt-based oxide ceramics are used as ceramic materials.

3. The method according to claim 1, wherein argon having an oxygen content of less than 0.1 ppm is used as the reducing atmosphere.

4. The method according to claim 1, wherein argon having an oxygen content of more than 100,000 ppm is used as the oxidizing atmosphere.

5. The method according to claim 1, wherein b), c) and d) are carried out in a same reducing atmosphere.

6. The method according to claim 1, wherein b), c), d) and e) are carried out in a reactor.

7. The method according to claim 1, wherein $CO_2$ is additionally supplied to the reducing atmosphere.

8. A method for producing a ceramic cathode layer, comprising lithium cobalt oxide, the method comprising:
   a) applying a coating to an electrically conductive substrate, the coating being in a form of a suspension including at least one suspending agent and lithium cobalt dioxide as a ceramic material,
   b) heating the ceramic coating in a reducing atmosphere such that the cobalt from the lithium cobalt dioxide is at least in part reduced to metallic cobalt and lithium carbonate is formed from the lithium,
   c) heating the coating in a reducing atmosphere to temperatures of more than 720° C. so as to form a melt comprising metallic cobalt and liquid lithium carbonate,
   d) densifying or sintering the coating in a reducing atmosphere at temperatures of less than 1,000° C., and
   e) reoxidizing the densified or sintered coating in an oxidizing atmosphere in a temperature range of between 400 and 1,000° C., wherein the metallic cobalt is oxidized so as to form cobalt oxide and reacts with the lithium carbonate so as to form lithium cobalt oxide.

9. The method according to claim 8, wherein the coating suspension comprises powdered lithium cobalt dioxide.

10. The method according to claim 8, wherein the sintering is carried out in a reducing atmosphere at temperatures of less than 850° C.

11. The method according to claim 8, wherein powdered lithium cobalt dioxide is used that has a particle size distribution having a $D_{50}$ value of less than 1 μm.

12. The method according to claim 8, wherein lithium and cobalt compounds or salts thereof that are soluble in the suspending agent used are additionally added to the coating suspension.

13. The method according to claim 12, wherein the soluble lithium and cobalt compounds or salts thereof are added to the coating suspension in a percentage by mass of at most 30 wt. %, based on the total mass of ceramic material.

14. The method according to claim 12, wherein lithium and cobalt are added in the form of soluble nitrates, carboxylates or propionates.

15. The method according to claim 12, wherein lithium and cobalt compounds are added to the coating suspension in a hyperstoichiometric ratio so as to compensate for loss of lithium during the sintering process.

16. The method according to claim 1, wherein a solid electrolyte is additionally added to the coating suspension.

17. The method according to preceding claim 16, wherein lithium niobate or lithium lanthanum zirconate is added to the coating suspension as the solid electrolyte.

18. The method according to claim 16, wherein the percentage by mass of the solid electrolyte in the coating suspension is less than 50 wt. %, based on the mass of the ceramic material.

19. The method according to claim 1, wherein the ceramic material has a particle size distribution having a $D_{50}$ value of less than 1 μm.

* * * * *